US008941859B2

(12) United States Patent
Atobe

(10) Patent No.: US 8,941,859 B2
(45) Date of Patent: Jan. 27, 2015

(54) INFORMATION PROCESSING METHOD, SYSTEM, AND STORAGE MEDIUM STORING A COMPUTER PROGRAM, THAT DETERMINE THE STATE OF AN INFORMATION PROCESING APPARATUS AND DISPLAY DIFFERENT CONTENTS BASED ON THE DETERMINED STATE

(75) Inventor: Hiroshi Atobe, Richmond (GB)

(73) Assignee: Canon Kabushiki Kaisha (JP)

( * ) Notice: Subject to any disclaimer, the term of this patent is extended or adjusted under 35 U.S.C. 154(b) by 2243 days.

(21) Appl. No.: 10/974,599

(22) Filed: Oct. 27, 2004

(65) Prior Publication Data

US 2005/0094787 A1 May 5, 2005

(30) Foreign Application Priority Data

Oct. 30, 2003 (JP) ................................ 2003-370867

(51) Int. Cl.
G06F 3/12 (2006.01)
H04N 1/00 (2006.01)
H04L 29/06 (2006.01)

(52) U.S. Cl.
CPC ....... *H04N 1/00408* (2013.01); *H04N 1/00204* (2013.01); *H04L 69/24* (2013.01); *H04N 2201/001* (2013.01); *H04N 2201/0039* (2013.01); *H04N 2201/0094* (2013.01)
USPC ............................. 358/1.15; 358/1.16; 713/1

(58) Field of Classification Search
USPC ............. 713/1; 709/230, 245; 358/1.15, 1.16, 358/1.13; 717/178; 399/366
See application file for complete search history.

(56) References Cited

U.S. PATENT DOCUMENTS

| 5,077,795 | A  | * | 12/1991 | Rourke et al. | ................ 399/366 |
|---|---|---|---|---|---|
| 6,256,107 | B1 | * | 7/2001 | Toda | ............................ 358/1.15 |
| 6,642,943 | B1 | * | 11/2003 | Machida | ...................... 358/1.15 |
| 6,754,723 | B2 | * | 6/2004 | Kato | ............................. 709/230 |
| 7,075,670 | B1 | * | 7/2006 | Koga | ........................... 358/1.15 |
| 7,474,435 | B2 | * | 1/2009 | Hirashima et al. | ........... 358/1.15 |
| 2001/0027517 | A1 | * | 10/2001 | Kato | ................................. 713/1 |
| 2001/0038462 | A1 | * | 11/2001 | Teeuwen et al. | ............. 358/1.15 |
| 2002/0016841 | A1 | * | 2/2002 | Hirashima et al. | ........... 358/1.15 |
| 2002/0051164 | A1 | * | 5/2002 | Watanabe et al. | ............ 358/1.13 |
| 2002/0083227 | A1 | * | 6/2002 | Machida | ........................... 713/1 |
| 2002/0144257 | A1 | * | 10/2002 | Matsushima | ................. 717/178 |
| 2002/0169884 | A1 | * | 11/2002 | Jean et al. | ..................... 709/230 |
| 2003/0046674 | A1 | * | 3/2003 | Gentry et al. | ..................... 713/1 |
| 2003/0058471 | A1 | * | 3/2003 | Okubo | ......................... 358/1.16 |
| 2003/0206312 | A1 | * | 11/2003 | McAfee et al. | .............. 358/1.15 |
| 2004/0098506 | A1 | * | 5/2004 | Jean | ............... 709/245 |
| 2004/0125394 | A1 | * | 7/2004 | Terao et al. | ................... 358/1.15 |

FOREIGN PATENT DOCUMENTS

| JP | 2000-49998 A | 2/2000 |
|---|---|---|
| JP | 2002-202876 A | 7/2002 |

\* cited by examiner

*Primary Examiner* — Nicholas Pachol
(74) *Attorney, Agent, or Firm* — Rossi, Kimms & McDowell LLP

(57) ABSTRACT

An information processing method which is capable of easily and reliably giving a user information on whether or not the user's information processing apparatus satisfies the requirements for receiving services provided by a service provider. It is determined whether or not a predetermined function and a program for enabling the function are installed in a multi-function printer, as a requirement for receiving a service provided by an application service provider. The result of the determination is displayed on a display of an operating section of the multi-function printer.

9 Claims, 8 Drawing Sheets

FIG. 4

| | | PDL/SEND/FAX FUNCTIONS ON MFP | FUNCTION NECESSARY FOR PROGRAM UPDATE | PUBLIC PRINT SERVICE & NECESSARY FUNCTION | DOCUMENT STORING SERVICE & NECESSARY FUNCTION | FAX TRANSFER SERVICE & NECESSARY FUNCTION |
|---|---|---|---|---|---|---|
| MFP(1) | PDL | × | × | ○ | × | × |
| | SEND | ○ | ○ | ○ | ○ | ○ |
| | FAX | ○ | ○ | × | × | ○ |
| SERVICE AVAILABLE? | | — | — | ○ | ○ | ○ |
| MFP(2) | PDL | ○ | × | ○ | × | × |
| | SEND | ○ | × | ○ | ○ | ○ |
| | FAX | × | ○ | × | × | ○ |
| SERVICE AVAILABLE? | | — | — | △ | △ | × |

INFORMATION PROCESSING METHOD, SYSTEM, AND STORAGE MEDIUM STORING A COMPUTER PROGRAM, THAT DETERMINE THE STATE OF AN INFORMATION PROCESING APPARATUS AND DISPLAY DIFFERENT CONTENTS BASED ON THE DETERMINED STATE

BACKGROUND OF THE INVENTION

1. Field of the Invention

The present invention relates to an information processing method of processing information, such as character information and image information, by an information processing system comprised of information processing apparatuses, such as multi-function printers (MFPs) having a plurality of functions including a printing function, a copying function, a facsimile function, and a scanning (information reading) function, and an application service provider (ASP) as a service provider, connected to the information processing apparatuses via the Internet as a communication network, the information processing system for implementing the method, a program for implementing the method, and a storage medium storing the program.

2. Description of the Related Art

A multi-function printer having a plurality of functions including a printing function, a copying function, a facsimile function, and a scanning function is capable of receiving various services from an application service provider providing via the Internet the services on the Internet.

Application service providers provide various services in all fields. The services provided by application service providers vary with the purposes and uses and target users, and some services necessitate corresponding functions at receiving ends of the services.

A first example of such services is a public print service which uploads document data in advance to a server on the Internet via the Internet, and enables any user to print out the uploaded document data by a multi-function printer via the Internet, anytime. To receive the public print service, the multi-function printer needs to have the function of uploading document data to the server via the Internet and the function of printing out document data by the multi-function printer (hereinafter referred to as "the PDL function"). Further, it can be envisaged that the multi-function printer will upload to the server not only data generated by application software, but also scanned image data generated by reading an image through a scanner provided in the multi-function printer, and therefore the multi-function printer also needs to have the function of generating scanned image data and transmitting the same (hereinafter referred to as "the SEND function").

Further, a second example of the services is a document storing service which transfers scanned image data from a multi-function printer to a server on the Internet and thereby allows various data to be stored on the server. To receive the document storing service, the multi-function printer needs to have the above-mentioned SEND function.

Furthermore, a second example of the services is a FAX transfer service which temporarily receives facsimile data from a multi-function printer to which the facsimile data was transmitted, and transfers the facsimile data to a server on the Internet to thereby allow a plurality of users connected to the Internet to view the facsimile data on the Internet. To receive the FAX transfer service, the multi-function printer needs to have the SEND function as well as the facsimile function for receiving facsimile data.

Conventionally, there has been proposed a technique that causes an image forming apparatus not equipped with some optional functions (such as a finisher function and a facsimile function) to introduce software for adding any of the optional functions that is desired to be used, and download a program for realizing the desired function using the introduced software, to thereby enable the apparatus to use the function (see Japanese Laid-Open Patent Publication (Kokai) No. 2002-202876).

In the above-described prior art, however, before actually using a service provided by an application service provider operating on the Internet, or before signing up for a new service of this type, a user cannot know whether or not a multi-function printer used by the user on a daily basis is sufficiently equipped with necessary functions for receiving the various services, or whether or not the multi-function printer is capable of fully receiving the contents of a desired service. Further, the user cannot get detailed information on what function the multi-function printer is lacking in receiving a desired service.

Furthermore, in another use environment, when a user, who has signed up as a subscriber for receiving services provided by an application service provider, is out e.g. on a business trip, and wants to receive the services already subscribed and received on a daily basis, using a multi-function printer installed in a branch office or the like, the user cannot know whether or not the multi-function printer is capable of receiving the subscribed services, until the user actually uses the multi-function printer.

Moreover, in still another use environment, when a user, who is not a subscriber to services provided by an application service provider, wants to log in as a guest to experience a part of a service provided by the application service provider while limiting the function for the service or wants to temporarily experience the service during a limited trial time period, the user cannot know whether or not the desired service can be received by using a multi-function printer at hand.

SUMMARY OF THE INVENTION

It is an object of the present invention to provide an information processing method and an information processing system for implementing the method, which are capable of easily and reliably giving a user information on whether or not the user's information processing apparatus satisfies the requirements for receiving services provided by a service provider, and a program for implementing the method and a storage medium storing the program.

To attain the above object, in a first aspect of the present invention, there is provided a method of processing information by an information processing system including a service provider, and at least one information processing apparatus connected to the service provider via a communication network, comprising a determination step of determining whether or not a predetermined function and a program for enabling the function are installed in the information processing apparatus, as a requirement for receiving a service provided by the service provider, and a display step of displaying a result of the determination made in the determination step.

With the arrangement of the information processing method according to the first aspect of the present invention, when a user subscribes to services on the Internet from an information processing apparatus, it is possible to easily and reliably give the user information on whether or not the information processing apparatus is equipped with functions demanded on a service-by-service basis, or information on functions which are not equipped.

To attain the above object, in a second aspect of the present invention, there is provided a method of processing information by an information processing system including a service provider, and at least one information processing apparatus connected to the service provider via a communication network, comprising a service subscription step of subscribing to services provided by the service provider, a selection step of selecting a service for subscription in the service subscription step, a determination step of determining whether or not the information processing apparatus satisfies a requirement for receiving the service selected in the selection step, and a display step of displaying details of the requirement if it is determined in the determination step that the requirement is not satisfied.

Preferably, in the first and second aspects of the present invention, the requirement is that the information processing apparatus has a function capable of receiving the service.

Preferably, in the first and second aspects of the present invention, the requirement is that the information processing apparatus has a program for enabling a function capable of receiving the service.

Preferably, in the first and second aspects of the present invention, when the information processing apparatus has a function capable of receiving the service, but not a program for enabling the function, a display screen prompting acquisition of the program is displayed in the display step.

Preferably, in the first and second aspects of the present invention, information indicating that the information processing apparatus has a function capable of receiving the service but not a program for enabling the function, or information indicating that the information processing apparatus has the function capable of receiving the service is selectively displayed in the display step.

Preferably, in the first and second aspects of the present invention, the information is at least one of character information and image information.

To attain the above object, in a third aspect of the present invention, there is provided an information processing system comprising a communication network, a service provider, and at least one information processing apparatus connected to the service provider via the communication network, the information processing apparatus comprises a determination device that determines whether or not a predetermined function and a program for enabling the function are installed in the information processing apparatus, as a requirement for receiving a service provided by the service provider, and a display device that displays a result of the determination made by the determination device.

To attain the above object, in a fourth aspect of the present invention, there is provided An information processing system comprising a communication network, a service provider, and at least one information processing apparatus connected to the service provider via the communication network, the information processing apparatus comprises a service subscription device that subscribes to services provided by the service provider, a selection device that selects a service for subscription by the service subscription device, a determination device that determines whether or not the information processing apparatus satisfies a requirement for receiving the service selected by the selection device, and a display device that displays details of the requirement if the determination device determines that the requirement is not satisfied.

Preferably, in the third and fourth aspects of the present invention, the requirement is that the information processing apparatus has a function capable of receiving the service.

Preferably, in the third and fourth aspects of the present invention, the requirement is that the information processing apparatus has a program for enabling a function capable of receiving the service.

To attain the above object, in a fifth aspect of the present invention, there is provided a computer-readable program for implementing a method of processing information by an information processing system including a service provider and at least one information processing apparatus connected to the service provider via a communication network, comprising a determination module for determining whether or not a predetermined function and a program for enabling the function are installed in the information processing apparatus, as a requirement for receiving a service provided by the service provider; and a display module for displaying a result of the determination made by the determination module.

To attain the above object, in a sixth aspect of the present invention, there is provided a computer-readable program for implementing a method of processing information by an information processing system including a service provider and at least one information processing apparatus connected to the service provider via a communication network, comprising a service subscription module for subscribing to services provided by the service provider, a selection module for selecting a service for subscription by the service subscription module, a determination module for determining whether or not the information processing apparatus satisfies a requirement for receiving the service selected by the selection module, and a display module for displaying details of the requirement if it is determined by the determination module that the requirement is not satisfied.

The above and other objects, features, and advantages of the present invention will become more apparent from the following detailed description taken in conjunction with the accompanying drawings.

BRIEF DESCRIPTION OF THE DRAWINGS

FIG. 4 is a diagram showing an example of a table summarizing the relationship between functions necessary for receiving various services provided by the information processing system and functions actually installed in multi-function printers;

DETAILED DESCRIPTION OF THE PREFERRED EMBODIMENTS

The present invention will now be described in detail with reference to the drawings showing a preferred embodiment thereof.

Figure 1:
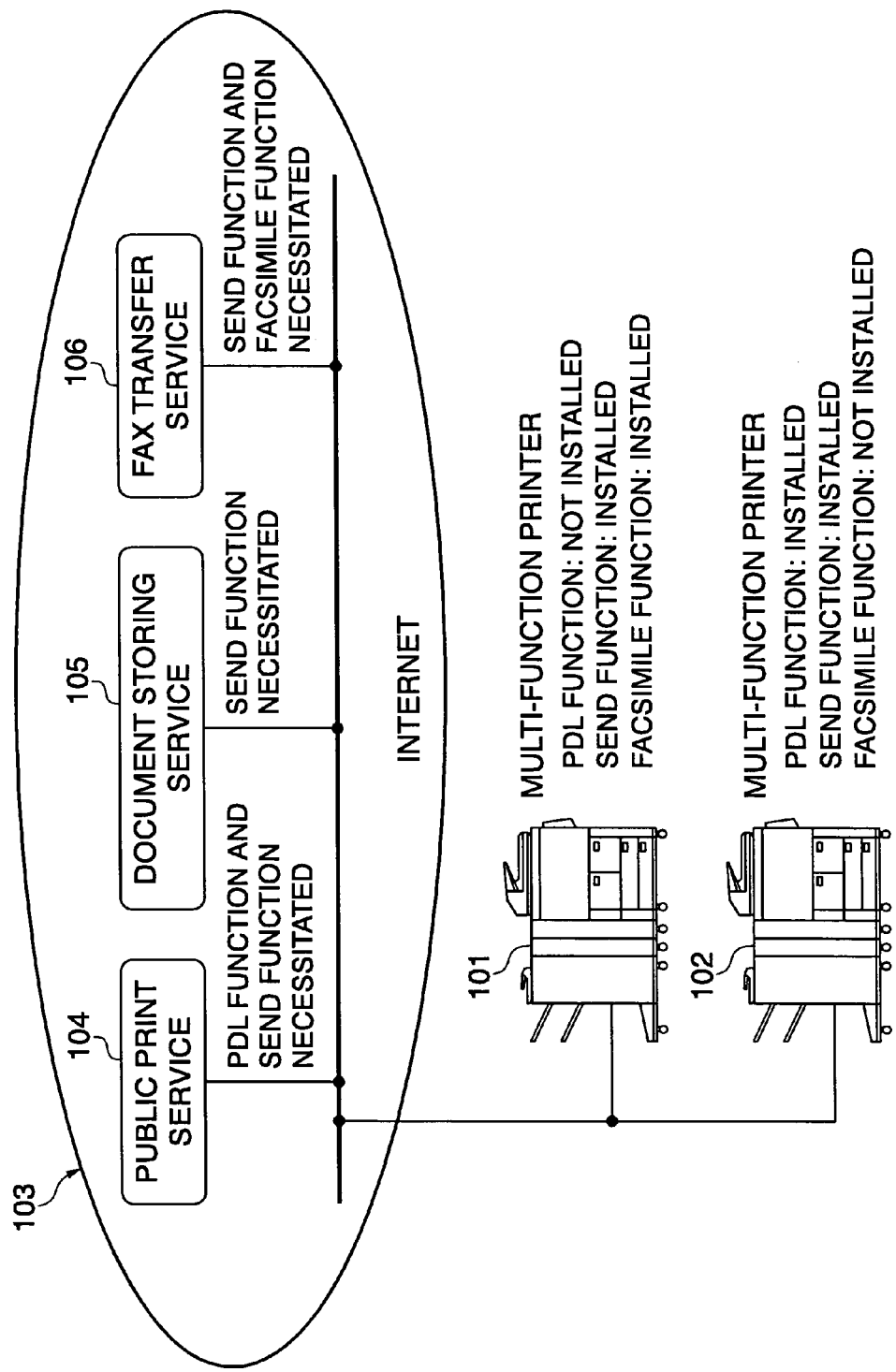
FIG. 1 is a diagram showing the whole arrangement of an information processing system according to an embodiment of the present invention.

FIG. 1 is a diagram showing the whole arrangement of an information processing system according to an embodiment of the present invention.

In FIG. 1, reference numerals 101 and 102 designate multi-function printers (MFPs) as information processing apparatuses. The MFPs 101 and 102 are equipped with a plurality of functions, such as a printing function, a copying function, a facsimile function, and a scanning function, and processes information including character information and image information.

It should be noted that these information processing apparatuses are not limited to MFPs, but may be implemented by printers, copying machines, facsimiles, or scanners (information reading apparatuses).

Reference numeral 103 designates the Internet via which application service providers (ASPs) provide various services. The MFP 101 and the MFP 102 are connected to the Internet 103. Reference numeral 104 designates a public print service, as one of services provided by the ASPs on the Internet 103. The public print service enables any user to download document data uploaded in advance to a server, not shown, on the Internet 103 via the Internet 103 to a designated MFP or printer, anytime, and print out the downloaded document data by the MFP or printer. To receive the public print service 104, the MFPs 101 and 102 need to have the function of uploading document data to the server via the Internet 103 and the function of printing out document data by the MFPs 101 and 102 (hereinafter referred to as the PDL function).

Reference numeral 105 designates a document storing service, as one of the services provided by the ASPs on the internet 103. The document storing service transfers scanned image data from the MFPs 101 and 102 to a server, not shown, on the Internet 103 and stores various data on the server. To receive the document storing service 105, the MFPs 101 and 102 need to have the aforementioned SEND (scanned data transfer) function.

Reference numeral 106 designates a FAX transfer service, as one of the services provided by the ASP on the internet 103. The FAX transfer service temporarily receives facsimile data sent to the MFPs 101 and 102 and transferred to a server, not shown, on the Internet 103 to thereby allow a plurality of users connected to the Internet to view the facsimile data on the Internet 103. To receive the FAX transfer service 106, the MFPs 101 and 102 need to have the SEND function as well as the facsimile function for receiving facsimile data.

Although the MFP 101 and the MFP 102 need to be equipped with the above-mentioned functions necessary for receiving the above-mentioned services on the Internet 103, in the present embodiment, it is assumed here that the MFP 101 is equipped with the SEND and facsimile functions, but not with the PDL function, whereas the MFP 102 is equipped with the PDL and SEND functions, but not with the facsimile function.

Figure 2:
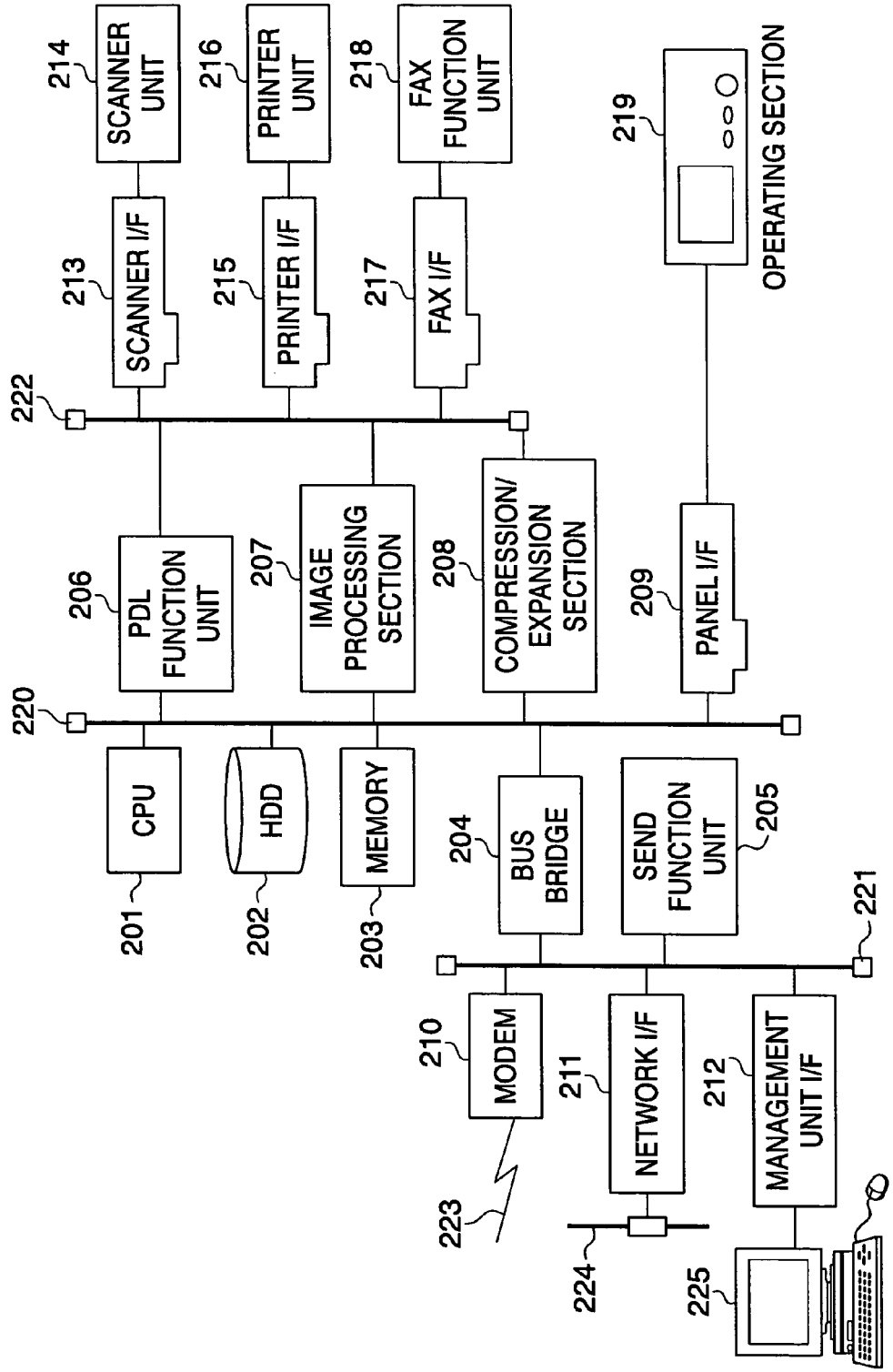
FIG. 2 is a block diagram showing the hardware configuration of a multi-function printer (MFP) in the information processing system in FIG. 1.

FIG. 2 is a block diagram showing the hardware configuration of the multi-function printers (MFPS) in FIG. 1. In FIG. 2, reference numeral 200 designates a multi-function printer (MFP) corresponding to the MFP 101 or 102 in FIG. 1.

The MFP 200 is comprised of a CPU (Central Processing Unit) 201, a hard disk drive (HDD) 202, a memory 203, a bus bridge 204, a SEND function unit 205, a PDL function unit 206, an image processing section 207, a compression/expansion section 208, a panel interface (panel I/F) 209, a modem 210, a network interface (network I/F) 211, a management unit interface (management unit I/F) 212, a scanner interface (scanner I/F) 213, a scanner unit 214, a printer interface (printer I/F) 215, a printer unit 216, a facsimile interface (FAX I/F) 217, a FAX function unit 208, an operating section 219, a high-speed CPU bus 220, a low-speed CPU bus 221, and a high-speed image bus 222.

The CPU 201 that controls the overall operation of the MFP 200 is implemented by a microprocessor and operates on a real-time OS (Operating System). The HDD 202 is a large-capacity storage device for storing a plurality of applications available for the operation of the CPU 201. The HDD 202 is controlled by the CPU 201.

The memory 203 is a work memory used for the operation of the CPU 201, and can be accessed at a high speed by the CPU 201. The MFP 200 may include a nonvolatile memory as the memory 203.

The bus bridge 204 connects between the high-speed CPU bus 220 and the low-speed CPU bus 221 to accommodate a difference in processing speed between the two buses. By way of the bus bridge 204, the CPU 201 operating at a high speed can access the SEND function unit 205 connected to the low-speed CPU bus 221 and operating at a low speed.

The SEND function unit 205 is implemented by hardware having the function of sending scanned image data generated from images read from the scanner unit 214 to a designated address on the Internet 103.

The PDL function unit 206 is implemented by hardware having the function of receiving PDL (Page Description Language) data, such as PostScript data and PCL (Printer Command Language) data, from the server and translating the same to generate a print image. Further, as described hereinafter, the PDL function unit 206 receives an image forming command described in a page description language (PDL) via an external interface or a LAN directly connectable to a computer, and converts the image forming command into a bitmap image according to the details of the command. The image forming command is input to the PDL function unit 206 from the high-speed CPU bus 220 to output an image to the high-speed image bus 222. The PDL function unit 206 can process PDLs including PostScript (registered trademark), PCL, LIPS (registered trademark) and CaPSL.

The image processing section 207 performs filtering processing, such as smoothing processing and edge processing, on the image data input via the high-speed image bus 222, according to a processing command issued by the CPU 201. Further, the image processing section 207 has an optical character recognition (OCR) function for recognizing characters in the image data input via the high-speed image bus 222, and an image separating function for separating the image data into a character part and an image part.

The compression/expansion section 208 compresses the image data input via the high-speed image bus 222, using encoding methods, such as MH, MR, MMR, and JPEG, and sends the compressed image data to the high-speed CPU bus 220 or the high-speed image bus 222, or conversely, expands compressed image data input via the two busses 220 and 222, according to the method used for the compression, and sends the expanded image data to, the high-speed image bus 222.

The panel interface 209 exchanges various control signals with the operating section 219. More specifically, the panel interface 209 transfers signals from input switches, such as keys arranged on the operating section 219, to the CPU 201, and performs resolution conversion for displaying the image data generated by the PDL function unit 206, the image processing section 207, and the compression/expansion section 208, on a display section, not shown, of the operating section 219.

The modem 210 is a function unit interposed between a public line 223 and the low-speed CPU bus 221, and has the function of modulating digital data sent from the low-speed CPU bus 221 and sending the modulated data to the public line 223, and the function of demodulating modulated data sent from the public line 223 to convert the data to digital data that can be processed by the MFP 200.

The network I/F 211 is a function unit for connecting the MFP 200 to a local area network (LAN) 224. The network I/F 211 is used for transmitting and receiving data to and from the LAN 224. The LAN 224 can be implemented by an Ethernet network, for example.

The management unit I/F 212 is a function unit for connecting between the MFP 200 and a managing apparatus 225. The management unit I/F 212 sends control commands to the managing apparatus 225 and receives enable signals from the managing apparatus 225.

The scanner I/F 213 has the function of transferring image data read by the scanner unit 214 to the high-speed image bus 222. The scanner I/F 213 also has the function of subjecting image data read by the scanner unit 214 to binarization processing optimal for processes to be executed afterward, and serial-parallel conversion dependent on the bus width of the high-speed image bus 222. Further, when image data read by the scanner unit 214 is color data, the scanner I/F 213 is capable of converting the data of three primary colors R, G, and B into color data of C, M, Y, B, and K.

The scanner unit 214 is an image reading apparatus equipped with an automatic original feeder. The scanner unit 214 includes a three-line (RGB) CCD color sensor or a single-line monochrome CCD sensor.

The printer I/F 215 transfers the image data sent from the high-speed image bus 222 to the printer unit 216. The printer I/F 215 has a bus width conversion function for converting the bus width of the high-speed image bus 222 to a buss width suitable for the range of levels of halftone of the printer unit 216, and the function of accommodating a difference between the printing speed of the printer unit 216 and the image data transfer speed of the high-speed image bus 222.

The printer unit 216 prints out image data received from the printer I/F 215 on recording media, such as sheets, as visible image data. The printer unit 216 may be implemented by an ink jet printer that prints out an image on a recording media by an ink jet printing method, an optical beam printer using electrophotographic technology that forms an image on a photoconductor drum using a laser beam or light generated by LEDs (light-emitting diodes), and then prints the image on a recording medium, a transfer-type printer using an ink ribbon, or a dye sublimation-type printer using an ink film. These printers include monochrome types and color types.

The FAX I/F 217 is a function unit used for exchanging information between the high-speed image bus 222 and a facsimile function unit 218. The facsimile function unit 218 is implemented by hardware having the function of transmitting and receiving image data to achieve facsimile transmission/reception, and connected to the high-speed image bus 222 via the FAX I/F 217.

The operating section 219 is comprised of the aforementioned display section and an input section. The display section is comprised of a display implemented by an LCD (liquid crystal display), and LEDs (light emitting diodes), for example. The input section is comprised of a touch panel type input section attached to the liquid crystal display, and a plurality of hard keys. A signal input via the touch panel type input section or a hard key is transmitted to the CPU 201 via the panel I/F 209, and the liquid crystal display displays character and/or image data received from the panel I/F 209 via the CPU 201.

The high-speed CPU bus 220 interconnects the CPU 201, the HDD 202, the memory 203, and the function units, to transfer data processed by the CPU 201 to the function units, and enable high-speed data transfer (DMA transfer) between the function units. Examples of this kind of high-speed CPU bus include a VL bus and a PCI bus. The low-speed CPU bus 221 has a bus configuration for slower-speed data transfer than the high-speed CPU bus 220, and interconnects between function units operating at relatively low processing speeds. An example of this kind of low-speed CPU bus is an ISA bus. The high-speed image bus 222 interconnects image input and output buses of the image data generating units (the PDL function unit 206, the image processing section 207, and the compression/expansion section 208) with the scanner I/F 213, and the printer I/F 215. The high-speed image bus 222 is not controlled by the CPU 201, but by a bus controller, not shown, for data transfer.

Figure 3:
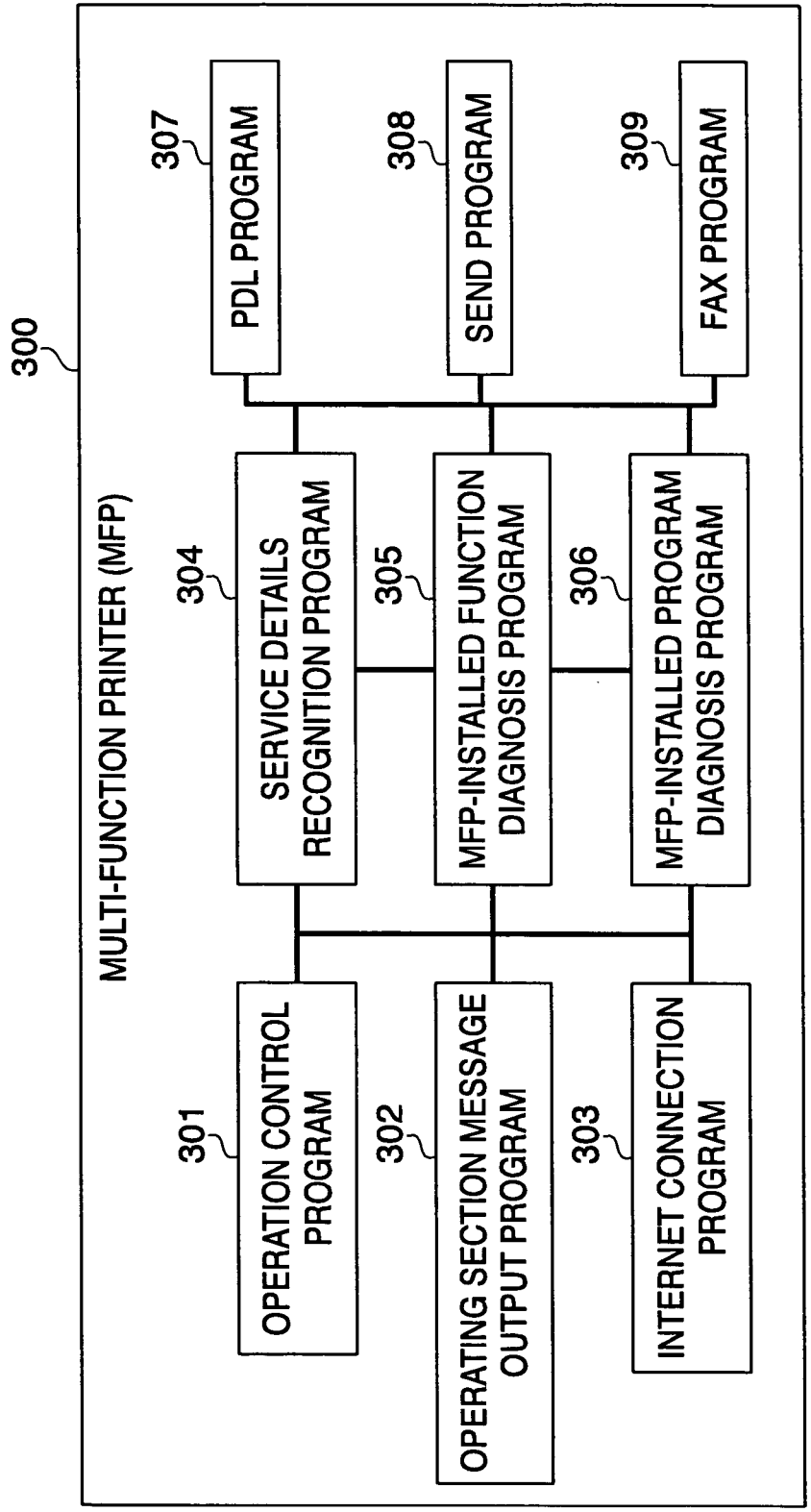
FIG. 3 is a block diagram showing the software configuration of the multi-function printer (MFP) in the multi-function printer (MFP) in FIG. 2.

FIG. 3 is a block diagram showing the software configuration of the multi-function printer (MFP) in FIG. 1. In FIG. 3, reference numeral 300 designates a multi-function printer (MFP) corresponding to the MFP 101 or 102 in FIG. 1 and the MFP 200 in FIG. 2.

The MFP 300 is comprised of an operation control program 301, an operating section message output program 302, an Internet connection program 303, a service details recognition program 304, an MFP-installed function diagnosis program 305, an MFP-installed program diagnosis program 306, a PDL program 307, a SEND program 308, and a FAX program 309.

The operation control program 301 controls the operating section 219. The operating section message output program 302 controls output of a message to be displayed on the display section of the operating section 219.

The Internet connection program 303 constructs a network using e.g. a networking device, such as an Ethernet device, and connects the network to the Internet. The service details recognition program 304 recognizes service details on the Internet 103 which are accessible by the MFP 300.

In the present embodiment, it is assumed that the ASP services accessible by the MFP 300 include the public print service, the document storing service, and the FAX transfer service, and the service details recognition program 304 recognizes the details of these services.

The MFP-installed function diagnosis program 305 diagnoses and recognizes functions actually installed in the MFP 300. In the present embodiment, it is assumed that the MFP-installed function diagnosis program 305 recognizes the MFP 101 as being equipped with the SEND function and the facsimile function, and the MFP 102 as being equipped with the PDL function and the SEND function.

The MFP-installed program diagnosis program 306 diagnoses various programs for realizing various functions and determines whether or not the programs are installed in the MFP 300 in the updated state.

The PDL program 307 is firmware for realizing the function of the PDL function unit 206. The PDL program 307 is stored in a storage device, not shown, as hardware of the PDL function unit 206 or in a storage device, not shown, incorporated in the MFP 300. By implementing these storage devices by flash ROMs (Flash Read Only Memories) or the like, the PDL program 307 can be externally downloaded or updated to the latest version.

The SEND program 308 is firmware for realizing the SEND function unit 205. The SEND program 308 is stored in a storage device, not shown, as hardware of the SEND function unit 205 or in the storage device incorporated in the MFP 300. By implementing these storage devices by the flash ROMs or the like, the SEND program 308 can be externally downloaded or updated to the latest version.

The FAX program 309 is firmware for realizing the function of the facsimile function unit 218. The FAX program 309 is stored in a storage device, not shown, as hardware of the facsimile function unit 218 or in the storage device incorporated in the MFP 300. By implementing these storage devices by the flash ROMs or the like, the FAX program 309 can be externally downloaded or updated to the latest version.

In the present embodiment, it is assumed that the MFP-installed program diagnosis program 306 recognizes the MFP 101 as being equipped with the latest SEND program 308 and the latest FAX program 309, and recognizes the MFP 102 as being equipped with the latest FAX program 309.

FIG. 4 is a diagram showing an example of a table summarizing the relationship between functions necessary for receiving the public print service 104, the document storing service 105, and the FAX transfer service 106, and functions actually installed in the MFPs.

By checking "Service Available?" fields in the table in FIG. 4, it can be determined whether or not currently installed functions and programs are sufficient for the MFP 101 (MFP (1)) and the MFP 102 (MFP (2)) to receive the services. The determination is performed by the MFP-installed function diagnosis program 305 and the MFP-installed program diagnosis program 306.

In FIG. 4, the symbol "○" indicates that a function and a program currently installed are sufficient for receiving the corresponding service. In other words, this symbol "○" indicates that the corresponding service can be received anytime. The symbol "Δ" indicates that a function currently installed is sufficient for receiving the corresponding service, but a program has to be externally downloaded or updated to the latest version. The symbol "×" indicates that a function currently installed is not sufficient for receiving the corresponding service.

Figure 5:
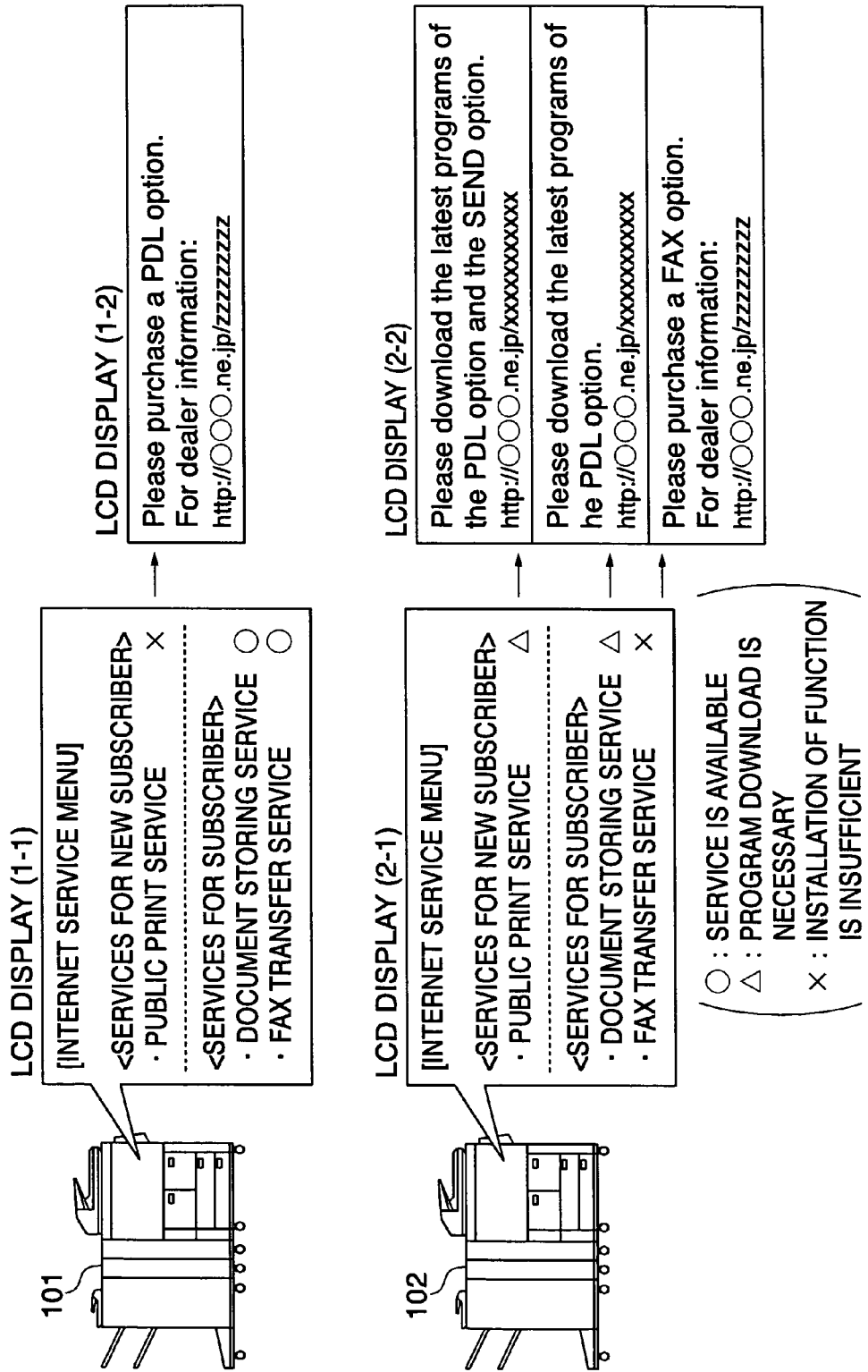
FIG. 5 is a diagram showing details displayed on an LCD of an operating section of the multi-function printer appearing in FIG. 1.

FIG. 5 is a diagram showing examples of details of messages generated based on the table shown in FIG. 4, by the operating section message output program 302. The messages are displayed on the LCD of the operating section 219.

An LCD display (1-1) and an LCD display (2-1) shown in FIG. 5 are examples in the case where a touch panel type LCD (liquid crystal display) is employed in the operating section 219, and the messages are displayed in the two sections of "Services for New Subscriber" and "Services for Subscriber" under the title of "Internet Service Menu". The section "Services for New Subscriber" displays information on whether or not functions and programs currently installed in the MFP are sufficient for receiving services that can be subscribed to, as icons corresponding to the aforementioned symbols: "○", "Δ" and "×".

The section "Services for Subscriber" displays information on whether or not functions and programs currently installed in the MFP are sufficient for receiving services already subscribed to, as icons corresponding to the symbols.

In the LCD display, the icons have the same meanings as those of the corresponding symbols, respectively.

When the icon "Δ" or the icon "×" in the LCD display (1-1) or (1-2) is depressed on the touch panel type LCD, a message shown in the LCD display (1-2) or the LCD display (2-2) is displayed.

More specifically, the icon "×" in the LCD display (1-1) is displayed to indicate that the MFP 101 is not equipped with the PDL function, so that when it is depressed, a message recommending purchase of the PDL function (optional article) is displayed as the LCD display (1-2) on the LCD as follows:

"Please purchase a PDL option. For dealer information: http:// ooo.ne.jp/zzzzzzzzz"

On the other hand, the icons "Δ" in the LCD display (2-1) are displayed to indicate that the PDL program and the SEND program for realizing the PDL function and SEND function in the MFP 102 have to be externally downloaded or updated to the latest versions, so that when the upper one, for example, of the icons "Δ" is depressed, a message recommending externally downloading of the PDL program and the SEND program or updating the programs to the latest versions is displayed as the LCD display (2-2) on the LCD as follows:

"Please download the latest programs of the PDL option and the SEND option. http://ooo.ne.jp/xxxxxxxxxx"

Further, when the "×" icon in the LCD display (2-1) is depressed, a message similar to the above-mentioned message in the LCD display (1-2) is displayed as the LCD display (2-2) on the LCD.

When the LCD display (2-1) shows that the MFP 102 is equipped with the SEND function, but not with the program for enabling the SEND function, a display screen recommending acquirement of the program for enabling the SEND function may be displayed in timing in which the icon "Δ" is displayed on the LCD before depression thereof.

Next, a description will be given of the operation of the information processing system shown in FIG. 1 with reference to FIGS. 6 to 8.

Figure 6:
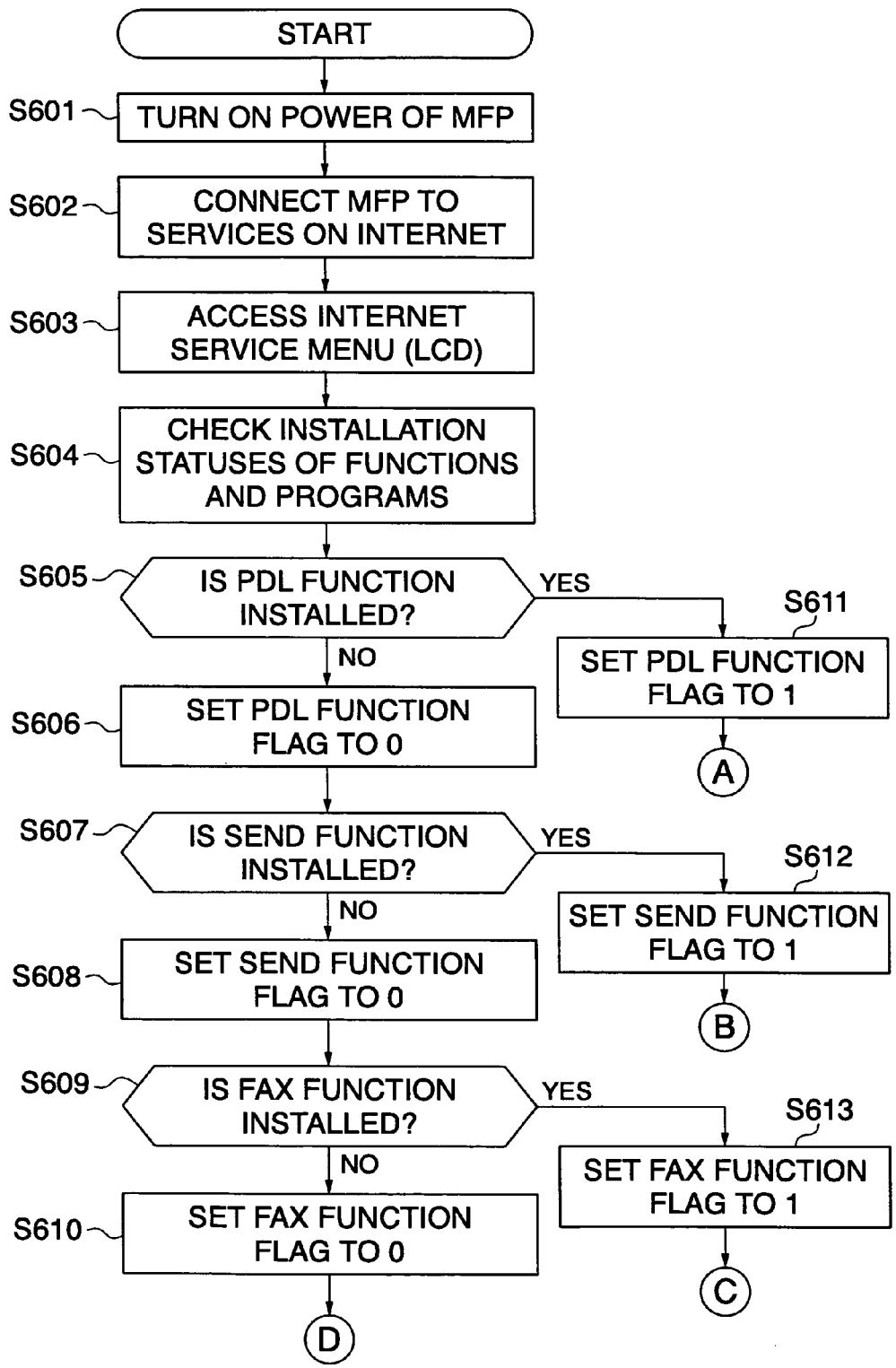
FIG. 6 is a flowchart showing a flow of the operation of the information processing system.
Figure 7:
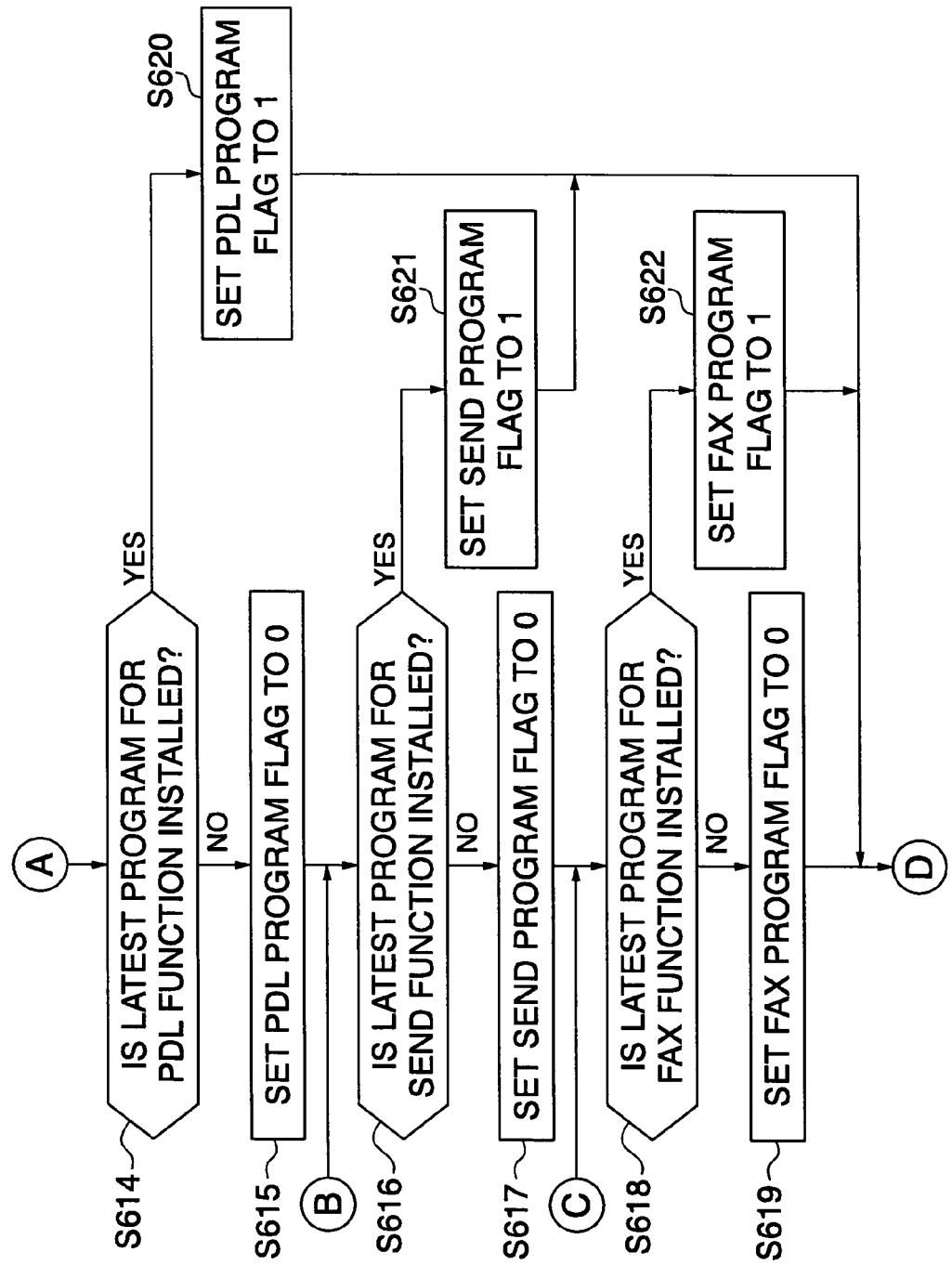
FIG. 7 is a flowchart showing a continued part of the flow of the operation of the information processing system.
Figure 8:
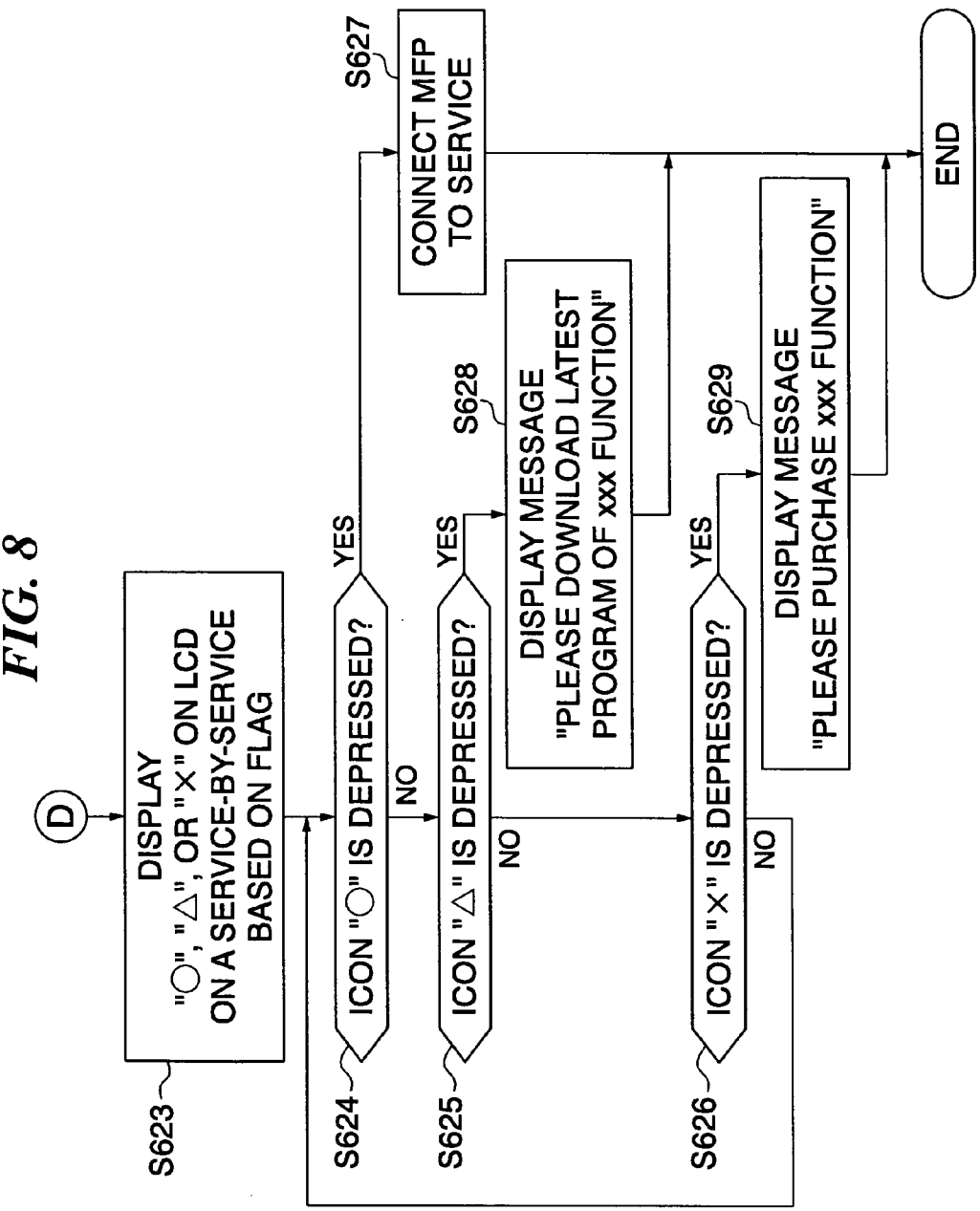
FIG. 8 is a flowchart showing a continued part of the flow of the operation of the information processing system.

FIGS. 6 to 8 are a flowchart showing a flow of the operation of the information processing system in FIG. 1.

Referring first to FIG. 6, first, the power of the MFP is turned on in a step S601. In the following step S602, the MFP is connected to the public print service 104, the document storing service 105 or the FAX transfer service 106, whereby communication with the service is enabled.

Then, in a step S603, the MFP displays the Internet service menu on the touch panel type LCD of the operating section 219. The user operates the touch panel type LCD to access the Internet service menu of services provided on the Internet described hereinbefore.

"The LCD display (1-1)" and "the LCD display (1-2)" in FIG. 5 are examples of the display contents of the service menu. The services demand MFPs at the service receiver end of functions necessary for receiving the services.

As described hereinabove, to receive the public print service 104 by an MFP, it is necessary to equip the MFP with the function unit for uploading document data to the server via the Internet 103, and the PDL function unit 206 for printing out the document data by the MFP. It can be envisaged that the MFP sometimes uploads to the server not only data generated by application software, but also scanned image data generated by reading an image through the scanner unit 214, and therefore the MFP also needs to have the SEND function unit 205 capable of generating scanned image data and transmitting the same.

To receive the document storing service 105 by an MFP, the MFP needs to have the SEND function unit 205.

To receive the FAX transfer service 106 by an MFP, the MFP needs to have the SEND function unit 205 and the facsimile function unit, 218 for receiving facsimile data.

Next, in a step S604, the service details recognition program 304 recognizes what functions are required for receiving the above-mentioned services. Further, the MFP-installed function diagnosis program 305 checks whether or not the MFP is equipped with the necessary functions recognized by the service details recognition program 304, on a service item-by-service item basis. In parallel with this, the MFP-installed program diagnosis program 306 checks whether or not programs for realizing the respective necessary functions recognized by the service details recognition program 304 are stored in the storage device as hardware for realizing the functions or in the storage device incorporated in the MFP. If the programs are stored, the MFP-installed program diagnosis program 306 checks whether or not the programs are the latest ones, on a function-by-function basis.

In a step S605, the MFP-installed function diagnosis program 305 checks whether or not the PDL function unit 206 is installed in the MFP as a requirement for receiving a predetermined service. If the PDL function unit 206 is installed in the MFP (YES to the step S605), the process proceeds to a step S611, wherein a PDL function flag is set to 1, and the flag value is stored in the HDD 202, followed by the process proceeding to a step S614 in FIG. 7.

In the step S614 in FIG. 7, the MFP-installed function diagnosis program 306 checks whether or not the firmware as the latest program for realizing the function of the PDL function unit 206, i.e. the latest PDL program 307 is installed in the MFP as a requirement for receiving a predetermined service. If the latest PDL program 307 is installed in the MFP (YES to the step S614), the process proceeds to a step S620, wherein a PDL program flag is set to 1, and the flag value is stored in the HDD 202, followed by the process proceeding to a step S623 in FIG. 8.

In this case, the installation status of the PDL function and that of the PDL program in the MFP are indicated by a pair of a PDL function flag and a PDL program flag, and expressed as a pair of values of PDL (a PDL function flag value and a PDL program flag value). Each flag indicates "installation" when set to 1, and "non-installation" or "insufficiency (e.g. a state where the program is not the latest version)" when set to 0. For example, PDL (1, 0) indicates that the PDL function unit 206 is installed, but the PDL program 307 is not installed or not the latest version though it is installed. The PDL function flag and the PDL program flag are set to a value of 0 by default.

In the step S623 in FIG. 8, the icon "○", "Δ" or "×" is displayed on the LCD on a service-by-service basis, based on the pair of the PDL function flag value and the PDL program flag value. For example, in the case of PDL (1, 0), the icon "Δ" is displayed as an entry corresponding to the PDL function unit 206 on the display of the operating section 219. In the case of PDL (1, 1), the icon "○" is displayed as the same entry. Further, in the case of PDL (0, 0), the icon "×" is displayed as the same entry.

On the other hand, if it is determined in the step S605 in FIG. 6 that the PDL function unit 206 is not installed in the MFP (NO to the step S605), the process proceeds to a next step S606, wherein the PDL function flag is set to 0, and the flag value is stored in the HDD 202, followed by the process proceeding to the next step S607.

If it is determined in the step S614 in FIG. 7 that the latest PDL program 307 is not installed in the MFP (NO to the step S614), the process proceeds to the next step S615, wherein the PDL program flag is set to 0, and the flag value is stored in the HDD 202, followed by the process proceeding to a step S616.

Referring again to FIG. 6, in the step S607, the MFP-installed function diagnosis program 305 checks whether or not the SEND function unit 205 is installed in the MFP as a requirement for receiving the predetermined service. If the SEND function unit 205 is installed in the MFP (YES to the step S607), the process proceeds to a step S612, wherein the SEND function flag is set to 1, and the flag value is stored in the HDD 202, followed by the process proceeding to the step S616 in FIG. 7.

In the step S616 in FIG. 7, the MFP-installed program diagnosis program 306 checks whether or not the firmware as the latest program for realizing the function of the SEND function unit 205, i.e. the latest SEND program 308 is installed in the MFP as a requirement for receiving the predetermined service. If the latest SEND program 308 is provided in the MFP (YES to the step S616), the process proceeds to a step S621, wherein the SEND program flag is set to 1, and the flag value is stored in the HDD 202, followed by the process proceeding to the step S623 in FIG. 8.

In this case, the installation status of the SEND function and that of the SEND program in the MFP are indicated by a pair of a SEND function flag and a SEND program flag, and expressed as a pair of values of SEND (a SEND function flag value and a SEND program flag value). Each flag indicates "installation" when set to 1, and "non-installation" or "insufficiency (e.g. a state where the program is not the latest version)" when set to 0. For example, SEND (1, 0) indicates that the SEND function unit 205 is installed, but the SEND program 308 is not the latest one though it is installed. The SEND function flag and the SEND program flag are set to a value of 0 by default.

In the step S623 in FIG. 8, the icon "○", "Δ" or "×" is displayed on the LCD on a service-by-service basis, based on the pair of the SEND function flag value and the SEND program flag value. For example, in the case of SEND (1, 0), the icon "Δ" is displayed as an entry corresponding to the SEND function unit 205 on the display of the operating section 219. In the case of SEND (1, 1), the icon "○" is displayed as the same entry. Further, in the case of SEND (0, 0), the icon "×" is displayed as the same entry.

On the other hand, if it is determined in the step S607 in FIG. 6 that the SEND function unit 205 is not installed in the MFP (NO to the step S607), the process proceeds to a step S608, wherein the SEND function flag is set to 0, and the flag value is stored in the HDD 202, followed by the process proceeding to a step S609.

If it is determined in the step S616 in FIG. 7 that the latest SEND program 308 is not installed in the MFP (NO to the step S616), the process proceeds to a step S617, wherein the SEND program flag is set to 0, and the flag value is stored in the HDD 202, followed by the process proceeding to a step S618.

Referring again to FIG. 6, in the step S609, the MFP-installed program diagnosis program 306 checks whether or not the facsimile function unit 218 is installed in the MFP as a requirement for receiving the predetermined service. If the facsimile function unit 218 is installed in the MFP (YES to the step S609), the process proceeds to a step S613, wherein the FAX function flag is set to 1, and the flag value is stored in the HDD 202, followed by the process proceeding to the step S618 in FIG. 8.

In the step S618 in FIG. 7, the MFP-installed program diagnosis program 306 checks whether or not the firmware as the latest program for realizing the function of the Facsimile function unit 218, i.e. the latest FAX program 309 is installed in the MFP as a requirement for receiving the predetermined service. If the latest FAX program 309 is installed in the MFP (YES to the step S618), the process proceeds to a step S622, wherein the FAX program flag is set to 1, and the flag value is stored in the HDD 202, followed by the process proceeding to the step S623 in FIG. 8.

In this case, the installation status of the FAX function and that of the FAX program in the MFP are indicated by a pair of a FAX function flag and a FAX program flag, and expressed as a pair of values of FAX (a FAX function flag value and a FAX program flag value). Each flag indicates "installation" when set to 1, and "non-installation" or "insufficiency (e.g. a state where the program is not the latest version)" when set to 0. For example, FAX (1, 0) indicates that the Facsimile function unit 218 is installed, but the FAX program 309 is not installed or not the latest one though it is installed. The FAX function flag and the FAX program flag are set to a value of 0 by default.

In the step S623 in FIG. 8, the icon "○", "Δ" or "×" is displayed on the LCD on a service-by-service basis, based on the pair of the FAX function flag value and the FAX program flag value. For example, in the case of FAX (1, 0), the icon "Δ" is displayed as an entry corresponding to the facsimile function unit 218 on the display of the operating section 219, and in the case of FAX (1, 1), the icon "○" is displayed as the same entry. Further, in the case of FAX (0, 0), the icon "×" is displayed as the same entry.

On the other hand, if it is determined in the step S609 in FIG. 6 that the facsimile function unit 218 is not installed in the MFP (NO to the step S609), the process proceeds to the next step S610, wherein the FAX function flag is set to 0, and the flag value is stored in the HDD 202, followed by the process proceeding to the step S623 in FIG. 8.

Further, if it is determined in the step S618 in FIG. 7 that the latest FAX program is not installed in the MFP (NO to the step S618), the process proceeds to the next step S619, wherein the FAX program flag is set to 0, and the flag value is stored in the HDD 202. Then, the process proceeds to the step S623 in FIG. 8, and the icon "○", "Δ" or "×" is displayed on the LCD based on the flags, as described above, followed by the process proceeding to the following step S624. Examples of display of the icons "○", "Δ" and "×" in the step S623 are shown in the "LCD display (1-1)" and the "LCD display (1-2)" in FIG. 5.

In the step S624 in FIG. 8, it is determined whether or not the icon "○" displayed on the display of the operating section 219 has been depressed in the step S623. If the icon "○" has been depressed, the process proceeds to a step S627, wherein the MFP is connected to the predetermined service, followed by terminating the present process.

On the other hand, if it is determined in the step S624 that the icon "○" has not been depressed, the process proceeds to a step S625, wherein it is determined whether or not the icon "Δ" displayed on the display of the operating section 219 has been depressed. If the upper one of the icons "Δ" in the LCD display (2-1), for example, has been depressed, the process proceeds to a step S628, wherein the message "Please download the latest programs of the PDL option and the SEND option. http://ooo.jp/xxxxxxxxxx", which is shown in the LCD display (2-2) in FIG. 5, is displayed on the display of the operating section 219, followed by terminating the present process.

On the other hand, if it is determined in the step S625 that the icon "Δ" has not been depressed, the process proceeds to a step S626, wherein it is determined whether or not the icon "×" displayed on the display of the operating section 219 has been depressed. If the icon "×" has been depressed, the process proceeds to a step S629, wherein the message "Please purchase the PDL option. For dealer information: http://ooo.jp/zzzzzzzzz", which is shown in the LCD display (1-2) in FIG. 5, is displayed on the display of the operating section 219, followed by terminating the present process.

On the other hand, if it is determined in the step S626 that the icon "×" has not been depressed, the process returns to the step S624.

Incidentally, with an increase in the number of services available on the Internet 103, display contents become immense and more complicated, and therefore the method of displaying contents on the display of the operation section 219 may be changed such that the contents corresponding to the entries of the icon "○" are omitted, and only the contents corresponding to the entries of the icons "Δ" and "×" are displayed. This method of displaying contents makes it possible to make most of a limited display space on the display to quickly inform the user of functions which are not installed or programs necessary which need to be downloaded or updated.

It should be noted that the mark or icon "Δ" or "×" may be displayed, based on results of a determination as to whether or not a function or a program currently installed is not sufficient for an MFP to receive a predetermined service, such that a user can distinguish between information indicating that the MFP is equipped with a predetermined function, but not with any program for enabling the function, and information indicating that the MFP is not equipped with the predetermined function.

The present invention is not limited to the above described embodiment, but can be modified in various manners based on the subject matter of the present invention, which should not be excluded from the scope of the present invention.

It is to be understood that the object of the present invention may also be accomplished by supplying a system or an apparatus with a storage medium (or a recording medium) in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of the above described embodiment on a computer, and the form of the program may be an object code, a program executed by an interpreter, or script data supplied to an OS.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program is supplied by downloading from another computer, a database, or the like, not shown, connected to the Internet, a commercial network, a local area network, or the like.

CROSS REFERENCE TO RELATED APPLICATION

This application claims priority from Japanese Patent Application No. 2003-370867 filed Oct. 30, 2003, which is hereby incorporated by reference herein.

What is claimed is:

1. An image forming apparatus communicable to an application service provider providing to the image forming apparatus a plurality of network services realized by a hardware unit comprising at least one of a scanning unit, a printing unit, or a facsimile unit, and software, the image forming apparatus comprising:
 a recognition unit that recognizes the hardware unit needed for receiving one of the network services provided by the application service provider;
 a first determining unit that determines whether or not the image forming apparatus is equipped with the hardware unit recognized by said recognition unit;
 a second determining unit that determines whether or not a program installed on the image forming apparatus for controlling the hardware unit is in an updated state, only if said first determining unit determines that the image forming apparatus is equipped with the hardware unit; and
 a displaying unit that displays:
  a first symbol, in a case where said first determining unit determines that the image forming apparatus is not equipped with the hardware unit, so as to display first information recommending that the image forming apparatus should be equipped with the hardware unit when the first symbol displayed by said displaying unit is depressed, without performing determination by said second determination unit;
  a second symbol, in a case where said first determining unit determines that the image forming apparatus is equipped with the hardware unit and said second determining unit determines that the program for controlling the hardware unit is not in the updated state, so as to display second information recommending that the program for controlling the hardware unit should be downloaded to the latest version and a URL address indicating a web site distributing the latest program when the second symbol displayed by said displaying unit is depressed, wherein after said first determining unit determines that the image forming apparatus is equipped with the hardware unit, said second determining unit determines whether or not a program for controlling the hardware unit is in an updated state; and
  a third symbol, in a case where said first determining unit determines that the image forming apparatus is equipped with the hardware unit and said second determining unit determines that the program for controlling the hardware unit is in the updated state, so as to connect the application service provider to receive the network service when the third symbol displayed by said displaying unit is depressed.

2. The image forming apparatus as claimed in claim 1, wherein:
 said recognition unit recognizes a plurality of hardware units needed for receiving another one of the network services provided by the application service provider,
 said first determining unit determines whether or not the image forming apparatus is equipped with the plurality of hardware units recognized by said recognition unit,
 said second determining unit determines whether or not each of programs for controlling the at least one of the plurality of hardware units is in an updated state, and
 the image forming apparatus further comprises:
 a case recognition unit that recognizes which state the image forming apparatus is in among a first state indicating that said first determining unit determines that the image forming apparatus is not equipped with at least one of the plurality of hardware units, a second state indicating that said first determining unit determines that the image forming apparatus is equipped with all of the plurality of hardware units and said second determining unit determines that at least one of the plurality of hardware units is not in the updated state, and a third state indicating that said first determining unit determines that the image forming apparatus is equipped with all of the plurality of hardware units and said second determining unit determines that all of the plurality of hardware units are in the updated state.

3. The image forming apparatus as claimed in claim 2, wherein said displaying unit displays information distinguishing whether the another one of the network services is a service for a new subscriber or a service for a subscriber, and whether the image forming apparatus is in the first state, in the second state, or in the third state.

4. A method of controlling an image forming apparatus communicable to an application service provider providing to the image forming apparatus a plurality of network services realized by a hardware unit comprising at least one of a scanning unit, a printing unit, or a facsimile unit, and software, the method comprising:
 a recognition step of recognizing the hardware unit needed for receiving one of the network services provided by the application service provider;
 a first determining step of determining whether or not the image forming apparatus is equipped with the hardware unit recognized in said recognition step;
 a second determining step of determining whether or not a program installed on the image forming apparatus for controlling the hardware unit is in an updated state, only if said first determining step determines that the image forming apparatus is equipped with the hardware unit; and
 a displaying step of displaying in a displaying unit:
  a first symbol, in a case where said first determining step determines that the image forming apparatus is not equipped with the hardware unit, so as to display first information recommending that the image forming apparatus should be equipped with the hardware unit when the first symbol displayed in said displaying step is depressed, without performing said second determining step;
  a second symbol, in a case where said first determining step determines that the image forming apparatus is equipped with the hardware unit and said second determining step determines that the program for controlling the hardware unit is not in the updated state, so as to display second information recommending that the program for controlling the hardware unit should be downloaded to the latest version and a URL address indicating a web site distributing the latest program when the second symbol displayed in said displaying step is depressed, wherein after said first determining step determines that the image forming apparatus is equipped with the hardware unit, said second determining step determines whether or not a program for controlling the hardware unit is in an updated state; and
  a third symbol, in a case where said first determining step determines that the image forming apparatus is equipped with the hardware unit and said second determining step determines that the program for controlling the hardware unit is in the updated state, so as to connect the application service provider to receive the network service when the third symbol displayed in said displaying step is depressed.

5. The method as claimed in claim 4, wherein:
said recognition step recognizes a plurality of hardware units needed for receiving another one of the network services provided by the application service provider,
said first determining step determines whether or not the image forming apparatus is equipped with the plurality of hardware units recognized in said recognition step,
said second determining step determines whether or not each of programs for controlling at least one of the plurality of hardware units is in an updated state, and
the method further comprises a case recognition step of recognizing which state the image forming apparatus is in among a first state indicating that said first determining step determined that the image forming apparatus is not equipped with at least one of the plurality of hardware units, a second state indicating that said first determining step determined that the image forming apparatus is equipped with all of the plurality of hardware units and said second determining step determined that at least one of the plurality of hardware units is not in the updated state, and a third state indicating that said first determining step determined that the image forming apparatus is equipped with all of the plurality of hardware units and said second determining step determined that all of the plurality of hardware units are in the updated state.

6. The methods as claimed in claim 5, wherein said displaying step displays information that distinguishes whether another one of the network services is a service for a new subscriber or a service for a subscriber, and whether the image forming apparatus is in the first state, in the second state, or in the third state.

7. A non-transitory computer-readable storage medium storing a computer program for implementing a method of controlling an image forming apparatus communicable to an application service provider providing to the image forming apparatus a plurality of network services realized by a hardware unit comprising at least one of a scanning unit, a printing unit, or a facsimile unit, and software, the method comprising:
a recognition step of recognizing the hardware unit needed for receiving one of the network services provided by the application service provider;
a first determining step of determining whether or not the image forming apparatus is equipped with the hardware unit recognized in said recognition step;
a second determining step of determining whether or not a program installed on the image forming apparatus is for controlling the hardware unit is in an updated state, only if said first determining step determines that the image forming apparatus is equipped with the hardware unit; and
a displaying step of displaying in a displaying unit:
a first symbol, in a case where said first determining step determines that the image forming apparatus is not equipped with the hardware unit, so as to display first information recommending that the image forming apparatus should be equipped with the hardware unit when the first symbol displayed in said displaying step is depressed, without performing said second determining step;
a second symbol, in a case where said first determining step determines that the image forming apparatus is equipped with the hardware unit and said second determining step determines that the program for controlling the hardware unit is not in the updated state, so as to display second information recommending that the program for controlling the hardware unit should be downloaded to the latest version and a URL address indicating a web site distributing the latest program when the second symbol displayed in said displaying step is depressed, wherein after said first determining step determines that the image forming apparatus is equipped with the hardware unit, said second determining step determines whether or not a program for controlling the hardware unit is in an updated state; and
a third symbol, in a case where said first determining step determines that the image forming apparatus is equipped with the hardware unit and said second determining step determines that the program for controlling the hardware unit is in the updated state, so as to connect the application service provider to receive the network service when the third symbol displayed in said displaying step is depressed.

8. The non-transitory computer-readable storage medium as claimed in claim 7, wherein:
said recognition step recognizes a plurality of hardware units needed for receiving another one of the network services provided by the application service provider,
said first determining step determines whether or not the image forming apparatus is equipped with the plurality of hardware units recognized in said recognition step,
said second determining step determines whether or not each of programs for controlling at least one of the plurality of hardware units is in an updated state, and
the method further comprises a case recognition step of recognizing which state the image forming apparatus is in among a first state indicating that said first determining step determined that the image forming apparatus is not equipped with at least one of the plurality of hardware units, a second state indicating that said first determining step determined that the image forming apparatus is equipped with all of the plurality of hardware units and said second determining step determined that at least one of the plurality of hardware units is not in the updated state, and a third state indicating that said first determining step determined that the image forming apparatus is equipped with all of the plurality of hardware units and said second determining step determined that all of the plurality of hardware units are in the updated state.

9. The non-transitory computer-readable storage medium as claimed in claim 8, wherein said displaying step displays information that distinguishes whether another one of the network services is a service for a new subscriber or a service for a subscriber, and whether the image forming apparatus is in the first state, in the second state, or in the third state.

* * * * *